Oct. 10, 1961    S. A. DOUGLAS    3,004,233
POTENTIOMETER
Filed Feb. 9, 1959    4 Sheets-Sheet 1

SAMUEL ARTHUR DOUGLAS
INVENTOR

BY

ATTORNEY

SAMUEL ARTHUR DOUGLAS
INVENTOR
ATTORNEY

Oct. 10, 1961 S. A. DOUGLAS 3,004,233
POTENTIOMETER
Filed Feb. 9, 1959 4 Sheets-Sheet 4

SAMUEL ARTHUR DOUGLAS
INVENTOR

BY

ATTORNEY

3,004,233
POTENTIOMETER
Samuel Arthur Douglas, Endicott, N.Y., assignor to General Precision Inc., a corporation of Delaware
Filed Feb. 9, 1959, Ser. No. 792,150
12 Claims. (Cl. 338—162)

This invention relates to potentiometers, and more particularly to versatile potentiometers having interchangeable components.

Resistors, both fixed and variable, are well known electrical components which have been in use almost as long as electricity itself has been utilized. Originally, resistors were fashioned haphazardly in any manner which would produce the desired effect, and their use was primarily for rought adjustment of the current flow or the potential in a circuit. As the science of electricity developed, so did the need for more accurate and predictable resistors, and for more effective and improved methods of manufacturing them.

As new resistor compositions were developed, they were used for variable as well as for fixed resistors; for the uses of equipment in which the resistance values in the circuits could be changed over wide ranges were expanding. However, it was not until the use of analog computers for both training and control purposes became widespread, that the demand for potentiometers of great accuracy and precision became really important. With the present emphasis upon electrical and electronic devices and control systems for operating everything from garage doors to guided missiles, the use of potentiometers has become extensive. And the potentiometers required for modern equipment must be precision instruments.

Since the recent developments which created the demand for potentiometer have been in large, complex electronic computer and control systems, efforts have also been made to increase the versatility of the instrument and decrease its size without sacrificing accuracy or ruggedness. The simulation on the ground, for example, of the operations of the multiude of parts in an aircraft in flight in response to the actions of a pilot trainee requires analog computers which utilize great numbers of both fixed and variable resistors. Simulated flight conditions must occasionally be changed, and often components must be substituted for those originally in use. The quantity of equipment which must ordinarily be kept in stock is enormous, and the task of completely replacing large quantities of potentiometers or other elements of the system is time consuming.

In an effort to overcome some of these problems, potentiometers have been designed to be stacked, in such equipment, and to be operated in ganged groups, thus standardizing their production, their size, and their shape, reducing the cost of manufacture and the space requirements in the machines in which they are used. But the problem of large inventories of different potentiometers to be used in different situations and under changing conditions is still acute. Recent developments have been made in an effort to solve this problem, and this invention is directed toward one solution.

It is, therefore, an object of this invention to provide a new and improved precision potentiometer.

It is another object of this invention to provide new and improved potentiometers having interchangeable parts.

It is a further object of this invention to provide new and improved potentiometers for utilizing more than one type of resistance element.

It is still another object of this invention to provide new and improved potentiometers utilizing more than one type of drive and driven arms.

It is still a further object of this invention to provide new and improved locking means for removable attaching brush arms to the rotating shafts of potentiometers.

It is yet a further object of this invention to provide a potentiometer having an electrical contact arm which rides on top of a resistance element and on top of a slip ring in a manner to eliminate the need for extreme concentricity in its construction.

Further objects and advantages of this invention will become apparent as the following description proceeds, which description should be taken in conjunction with the accompanying drawings in which.

Figure 1:
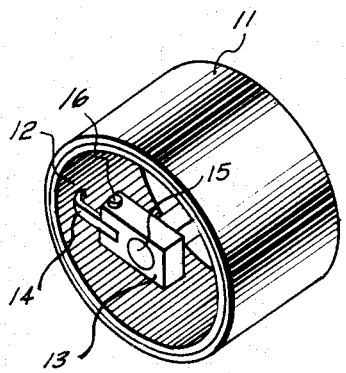
FIG. 1 illustrates, in perspective, a standard potentiometer of the prior art type.

Referring now to FIG. 1 in detail, the reference numeral 11 designates a housing for a potentiometer which contains a resistance element 12 arranged around the inner periphery of the housing 11. A contact arm 13 carrying a contact brush 14 is carried by a rotatably mounted shaft 15 within the potentiometer to contact the resistance element 12. The brush 14 is mounted on the arm 13 by means of a set screw 16.

The potentiometer illustrated in FIG. 1 is a standard potentiometer of the prior art type. The resistance element 12 has been shown as a wire-wound element, but it may be formed by deposition of suitable resistance material, by the evaporation of a suitable film upon an insulating tape or by any of the other well-known methods of forming resistor elements for annular openings. The rotating brush arm 13 is mounted on the shaft 15 by means of a set screw or other clamping means (not shown) and the brush element itself 14 is fastened to the arm 13 by means of the set screw 16. Neither the arm 13 nor the contact element 14 is adjustable or readily removable in the type of potentiometer shown in FIG. 1. As a result, these prior art types of potentiometers are not readily modified, and in an organization which requires a large variety of potentiometer values and structures, a large inventory must be maintained in order to meet all the needs.

Figure 2:
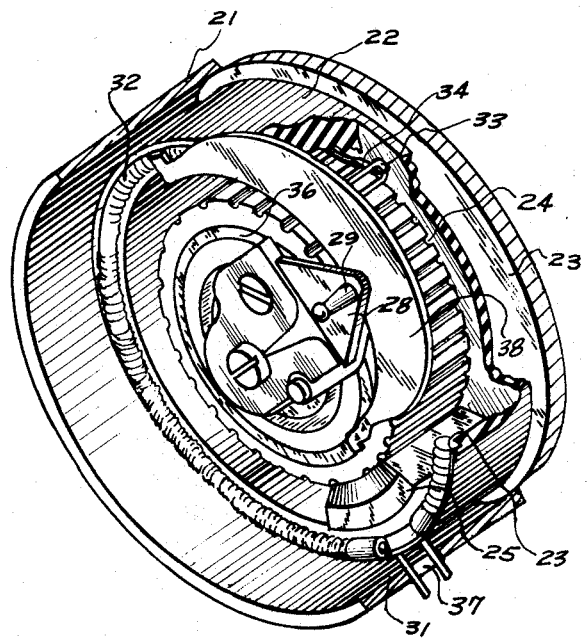
FIG. 2 is a perspective view in partial section of a new and improved potentiometer in accordance with the principles of this invention.
Figure 3:
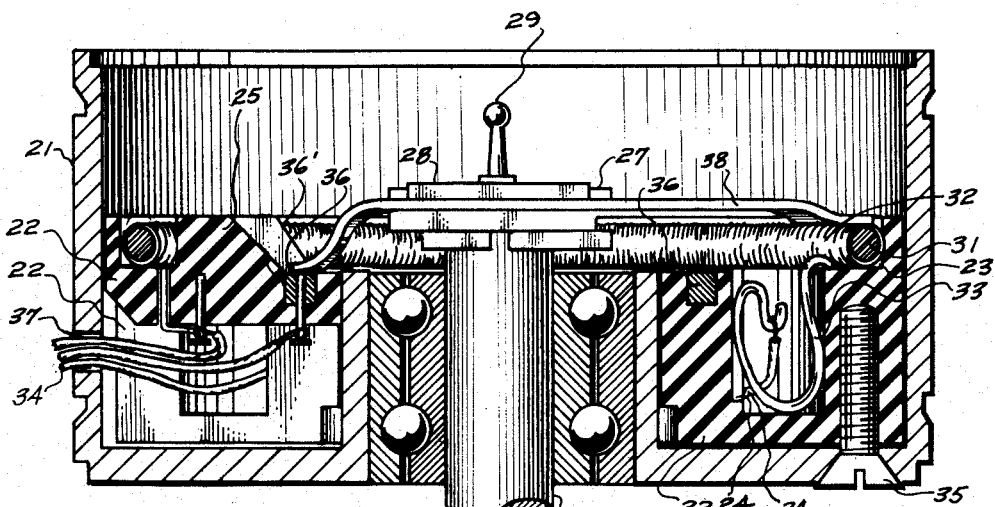
FIG. 3 is a sectional view of the new and improved potentiometer of FIG. 2.

Referring to FIG. 2, an improved form of potentiometer is illustrated in partial section. This potentiometer comprises a casing 21 having an insert 22 for supporting a resistance element 32 of different form from that shown in FIG. 1. The insert 22 has a recessed seat portion 23 and a concentric inner ring having slots 24 cut therein. A panel 25, integral with the insert 22, serves both as an anchor to anchor the insert 22 to the case 21 by means of screws (not shown) and as a terminal board by which wires from taps or the potentiometer elements may be connected. FIG. 3 is a sectional view of the potentiometer illustrated in FIG. 2 showing the contact arm assembly 27 and the resistance element 32 in place.

The insert 22 is formed of insulating material and carries a torroidal resistance element 32 wound about an annular ring member 31. A spring wire tap 33, or a plurality of spring wire taps such as 33 generally U-shaped in form, may be inserted in one or more of the slots 24 with one end of the tap in contact with the resistance element 32. A wire such as 34 is connected to the other end of each tap 33 and is brought to an outside connection panel for connection to other apparatus through an opening in the underside of the panel 25 and the insert 22 and through an opening 37 in the casing 21. A screw 35 is shown serving to hold the insert 22 in a fixed position in the casing 21. Through the center of the casing 21, usually supported by ball-bearings, is a shaft 26 on one end of which is an inside contact arm assembly 27 and to the other end of which may be connected an outside contact arm (not shown). An extension 28 of the arm 27 carries the brush elements 38 which serve to make contact between the portions of the torroidal resistance element 32 and a slip-ring 36 which fits in a notch 36' in the upper surface of the insert 22. A pin 29, mounted on the end of the extension arm 28, serves to make drive connection with the outside arm of a potentiometer which may be mounted axially on the open side of casing 21 for ganged operation.

By means of the insert 22 a standard potentiometer housing, such as housing 11 shown in FIG. 1, may be used for torroidal resistance elements as well as the standard resistance elements such as 12 of FIG. 1. In addition, provision is made in the insert 22 for the addition of fixed taps as indicated at 33, if desired, to provide fixed resistance values between either end of the torroidal resistance element 32 and the wire 34 from the tap. The insert 22 may be readily removed together with an assemblage of resistance elements, wiper arms, and slip rings by the removal of screws 35 and the axial displacement to one end of the housing 21 of the insert 22. In this manner a torroidal resistance element 32 may be easily substituted for the standard flat resistance element 12 (shown in FIG. 1) of a standard potentiometer to greatly increase the versatility of the potentiometer, eliminating the need for storing a separate potentiometer to be used for each new situation. This construction offers the advantage of permitting good contacts between the brush, the slip ring and the potentiometer without requiring extreme concentricity between the elements.

Figure 5:
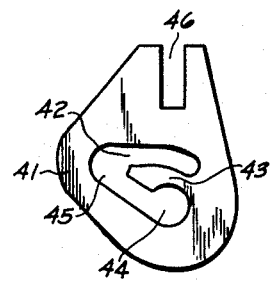
FIG. 5 is a plan view of a portion of the arm of FIG. 4.
Figure 4:
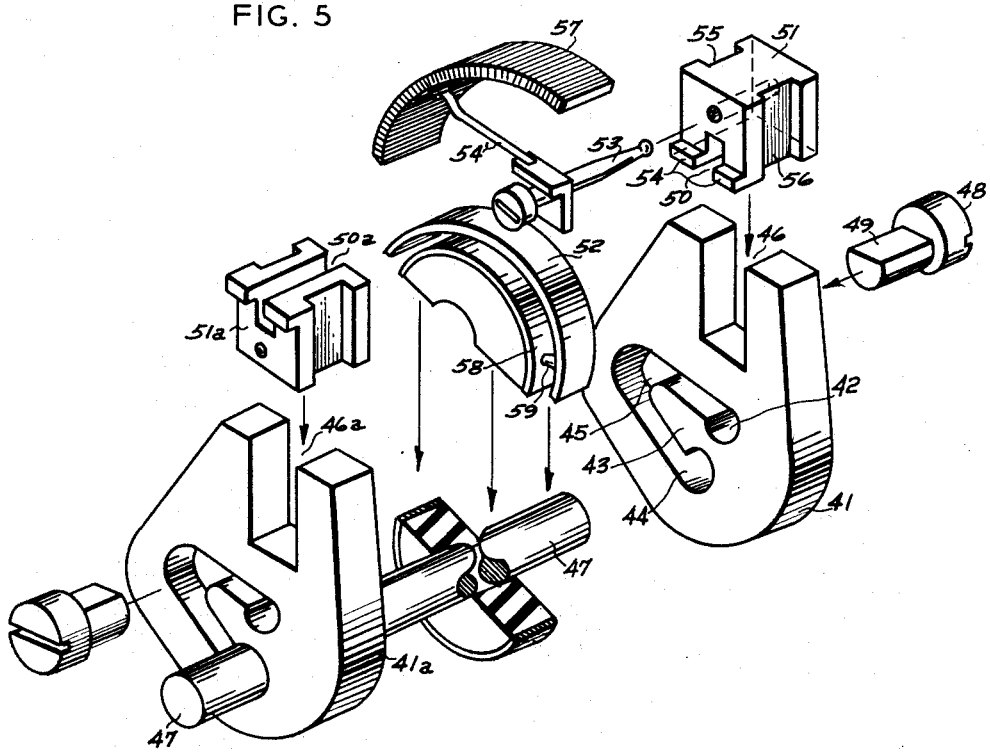
FIG. 4 is an exploded view, in perspective, of an arm for use in the potentiometers of FIGS. 1 or 2.

In addition to being able to change the resistance elements of a potentiometer, it is often desirable to provide new or different contact elements, because the inserts 22 of the potentiometer may support resistance elements or slip rings of varying diameters. Thus, the positioning of the contact brushes to ensure contact between the slip-rings of the unit and the resistance elements may be different for different styles of resistance elements and for different purposes. FIGS. 4 and 5 illustrate, in perspective and elevation respectively, a contact arm which may be used with any type of resistance element, either the flat resistance element of FIG. 1 or the torroidal resistance element 32 of FIG. 3. The body of the contact arm, or tongue, 41 is formed of a hard metal such as stainless steel or Monel metal, having natural resilience which may be punched from suitable stock. It is formed with a generally U-shaped slot 42 to provide a springy arm 43. At one end of the U-shaped slot 42 is a large circular opening 44 through which a shaft 47 may be passed. At the vertex of the U is another, generally circular shaped opening 45. A stud 48, having a slotted head and a shank portion with a flat 49 thereon, is formed to fit in the generally circular opening 45. At one end of the arm 41 is an elongated notch 46 into which an insulating brush-holder 51 is adapted to fit. The insulating brush-holder 51 may carry a metal contact brush element 52 which is fastened to the brush-holder 51 by means of a combination drive pin and fastener 53 against tabs 54 through appropriate aligned openings in the brush member 52 and the support 51. The support 51 is formed with notches 55 and 56 on each side for straddling the sides of the notch 46 in the metal arm 41 and is made of a resilient insulating material, such as nylon, which can be made to provide an interference fit and thus to eliminate backlash between the metal arm and the support.

In operation, the proper contact brush element 52 for the particular configuration of resistance elements and slip-rings to be used are assembled on the insulating support 51. The support is then inserted in the notch 46 to form a single unitary brush-holder for the potentiometer. The arm member 41 is then placed over one end of a short shaft 47 so that the shaft passes through the opening 44 in the arm 41. The stud member 48 is inserted into the other opening 45 in the arm 41 and is rotated so that the non-flat portion bears up against the springy arm, or tongue, 43 forcing that arm to deform and wrap more tightly about the shaft 47, holding the shaft firmly in its grip. It may be noted that stud member 48 locks the arm 41 to the shaft with a pre-set torque which cannot vary or change. The arm is then mounted securely on the shaft to be rotated therewith. To release the arm 41 for a zero adjustment purpose or to rotate it about the shaft 47 or for removal or replacement purposes, it is only necessary to turn the stud member 48 by means of a screw-driver or other appropriate means until the flattened portion 49 faces the springy arm 43 allowing the arm 43 to return to its zero position and release the shaft 47. The stud 48 may have an eccentric shank portion or a circular wedge-shaped shank, either of which will force arm 43 against the shaft 47 when rotated.

The foregoing discussion concerns primarily the drive arm 41 located in the right portion of FIG. 4. This arm will be mounted, together with the elements associated with it which are numbered from 42 through 56, on the inside of a potentiometer so that the wiper arm 54' may contact the resistance elements of a potentiometer 57 while the brush element 52 contacts a ring 58 through brushes such as 59. This inner arm may be called the driving arm and be designed to fit on the shafts 47 inside the potentiometer in such a way that the drive pin 53 will be facing in the direction of the open end of a potentiometer. The drive pin 53 will then be able to contact an open slot such as 50a in an adjacent support 51 which is oriented with respect to a support arm in the way that is shown in 51a on the left side of FIG. 4.

The unit in FIG. 4 may be assembled, on the shaft 47 to form driver and driven arms, in one of the previously described potentiometers such as those in FIG. 1 through FIG. 3. As stated in the last paragraph, arm 41 will in that case be the driver arm and it will be located inside a potentiometer case such as 11 in FIG. 1 or 21 in FIG. 2. The arm 41a, mounted near the other end of the same shaft 47 as is arm 41, will be located outside the potentiometer case with its support element assembled into slot 46a in the direction shown so that a drive pin 53 from another potentiometer may engage the support element 51a in slot 50a to drive the arm 41a in response to the motion of the driver arm of said adjacent potentiometer. It will be recognized that the arm 41a, and its corresponding elements, is identical to arm 41 and that support 51a is identical to support 51 with the difference that it has been turned over.

Figure 6:
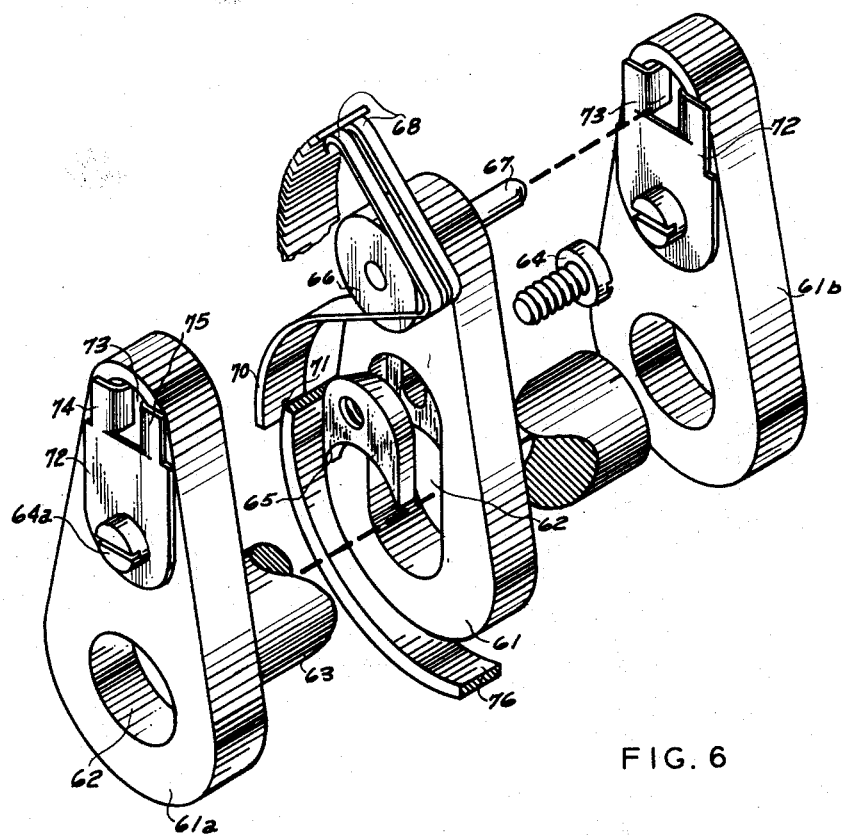
FIG. 6 is an exploded view in perspective of a new and improved potentiometer arm for use in the potentiometers of FIGS. 1 or 2.
Figure 7:
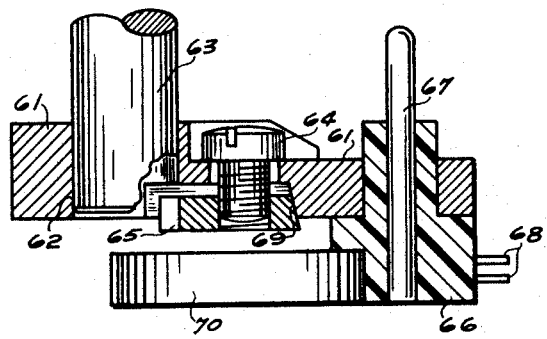
FIG. 7 is a sectional view of a portion of the arm of FIG. 6.

A modified contact arm is illustrated in FIGS. 6 and 7 which may be adapted for use in the potentiometer of FIGS. 1 or 2. The arm 61 is formed of metal or any other suitable construction material and has formed therein an opening 62 for the passage of a rotor shaft 63 therethrough. A screw 64 passes through another opening in the arm 61 to thread into a wedge member 65 which passes between the wall 69 of a recess or a projection in the under side of the arm 61 and the shaft 63. At one end of the arm 61, a block 66 of insulating material, such as a resin plastic, is fastened to support a drive pin 67, arm 70, brush contacts 68 and brush contact 71. Brush contact 71 engages a slip ring such as 76.

An important feature of a good potentiometer arm in precision potentiometers is the relative ease with which the position of the arm on the drive shaft can be changed. Since in use, many potentiometers are stacked to be driven simultaneously, if the resistance-position characteristic of the potentiometer is to be modified, it must be done either by replacing the entire potentiometer or by changing the angular position of the potentiometer arm on the shaft with respect to the position of the drive means. In the structure of FIGS. 6 and 7, the arm 61 is maintained in position on the drive shaft 63 by the action of the wedge 65 which is forced between the shaft 63 and the wall 69. To change the position of the arm 61 on the shaft 63, it is merely necessary to loosen the screw 64, freeing the wedge 65. The arm 61 is then rotated to its new position and the screw 64 tightened, forcing the wedge 65 into holding engagement between the arm 61 and the shaft 63. In addition, since the major portion of the arm 61 can be made of metal, great structural rigidity and aging stability can be obtained.

The arm 61 in FIG. 6, when assembled on one end of shaft 63, will function as a driver arm of the potentiometer as did arm 41 in FIG. 4, with the drive pin 67 in position to engage the driven arm of an adjacent potentiometer located in tandem. The arm 61a in FIG. 6 is identical to arm 61, but in lieu of the element 66 it has a driven element 72 made of spring material which is held in place by the screw 64a which also locks a wedge like 65 (not visible in this view) against the shaft 63. The element 72 includes an opening 73 in one end formed by two tabs 74 and 75 of spring material. The opening 73 is of such size as to admit a drive pin 67, but the springs 74 and 75 firmly grip the drive pin 67 to prevent backlash. The element 61b is identical to 61a and is included to illustrate the fact that the drive pin 67 will engage the driven arm of adjacent potentiometers through the opening 73.

Figure 8:
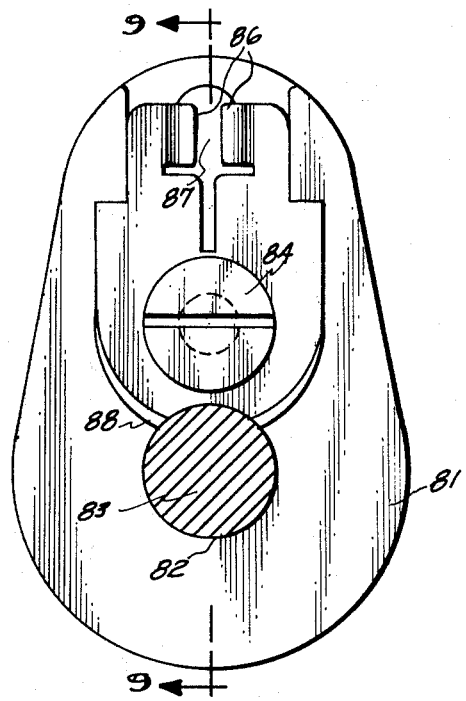
FIG. 8 is a plan view of a new and improved potentiometer arm for use in potentiometers of FIGS. 1 or 2.
Figure 9:
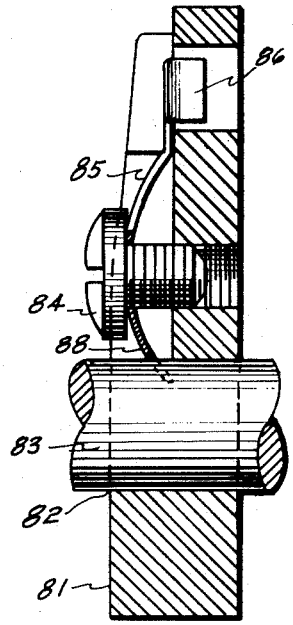
FIG. 9 is a sectional view of the potentiometer arm of FIG. 8 taken along the line 9—9.

A modified form of the driven arm of FIG. 6 is shown in FIGS. 8 and 9. The arm 81 comprises a body formed of metal or any other suitable structural material with an opening 82 for the passage therethrough of a drive shaft 83. A screw 84 is threaded into the arm 81, passing through an opening in an arched spring member 85. The spring member 85 has a curved end 88 pressing against one side of the shaft 83, and its other end, which is bifurcated and bent to form wings 86, inserted into an opening 87 in the arm 81. Although not shown, the arm 81 like the arm 61 in FIG. 7 can support an insulated member like 66 in FIG. 7 which, in turn, can carry a driving pin which engages the opening 87 of a driven arm on another potentiometer.

The structure of FIGS. 8 and 9 is designed to allow positive locking of potentiometer arms onto the drive shaft of the potentiometer while allowing for easy removal or adjustment. The spring member 85 is loosened by turning the screw 84 counterclockwise (or clockwise if threads are left handed) so that it moves out of the arm 81. The arm 81 is then placed on the drive shaft 83 and the screw 84 is tightened by turning clockwise, compressing the spring 85 and flattening the arc. This forces the end 88 of the spring 85 against the shaft 83 to grip the shaft and prevent the arm 81 from moving in relation thereto. The wings 86 bounding the opening 87 prevent the spring member 85 from rotating on the arm 81 or from moving away from the shaft 82 as well as providing a firm connection between the driving and driven arms of adjacent potentiometers. To change the position of the arm 81 on the shaft 83, it is only necessary to loosen the screw 84 until the spring 85 releases the shaft 83, change the position of the arm, and tighten the screw 84.

Figure 10:
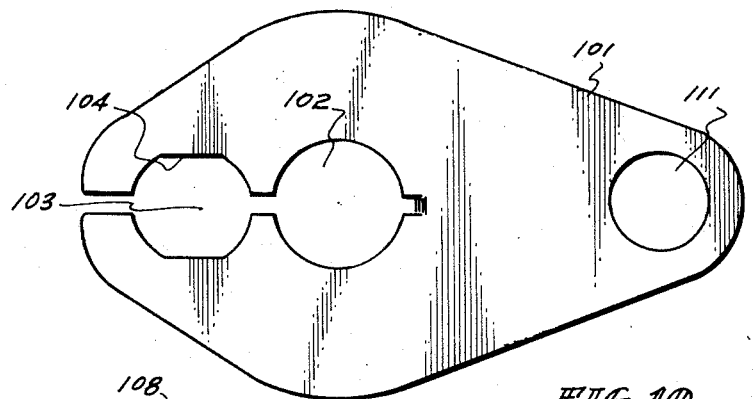
FIG. 10 is a plan view of a new and improved arm for use in the potentiometers of FIGS. 1 or 2.
Figure 11:
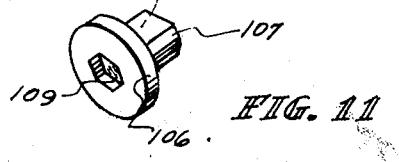
FIG. 11 is an elevational view of a stud for use in the arm of FIG. 10.

Another form of potentiometer arm for either inside or outside use is illustrated in FIG. 10. The arm 101 is formed of relatively flat spring material with an opening 102, through which the drive shaft of the potentiometer is to pass, of smaller diameter than that of the shaft itself. A second opening 103 through the arm 101 is formed with flat portions 104 diametrically opposite each other for accepting the shank 107 of a spreading cam 106 (FIG. 11). The cam 106 has a head portion with a hexagonal socket 109 formed therein for receiving a socket-type wrench. The shank 107 of the cam 106 is generally cylindrical in shape with two flat portions 108 on opposite sides. A third opening 111 in the arm 101 is used to support a block of insulating material for carrying either contact brushes and driving pin, if the arm 101 is an inside arm, or a driven member, if the arm 101 is to be outside the potentiometer casing.

The resilient material of the arm 101 tightly grips the drive shaft of a potentiometer upon which it is mounted by the inherent resistance to deformation of the material itself. To apply the arm to the shaft of a potentiometer, the cam 106 is inserted in the opening 103 with the flat sides 108 of the cam 106 aligned with the flat sides 104 of the opening 103. The cam is then rotated by means of a wrench inserted in the opening 109 in its head, to distend the opening 102 of the arm 101. When the opening 102 has been sufficiently spread by the force of the curved portions of the cam shank 107 bearing against the flat sides 104 of the opening 102, the arm is placed on the drive shaft and the cam 106 rotated until it is free in the opening 103. The resilience of the material of the arm 101 tends to return the opening 102 to its original size and shape, gripping the shaft firmly. This procedure is repeated when the position of the arm 101 on the shaft is to be changed.

The arm structures illustrated and described herein may be used for either inside or outside arms merely by changing the element supported by the arm. By this means, the versatility of the structures is greatly increased, reducing the number of different components it is necessary to keep in stock for complete servicing of a large number of potentiometers.

This specification has described new and improved potentiometer structures, and in particular, potentiometers in which several different forms of potentiometer elements may be interchangeably substituted to meet the requirements of any situation. The structures described above are particularly useful wherever large numbers of similar type potentiometers are used to perform a multitude of functions, but they are also of value for the user of individual potentiometers, for the number of applications and combinations of applications to which the potentiometer can be put are greatly multiplied thereby without greatly increasing inventory problems. It is realized that the above description of this invention may suggest to others skilled in the art different forms which the invention may take, and it is therefore intended that this invention be limited only by the scope of the appended claims.

What is claimed is:

1. A potentiometer comprising a resistance element and a rotatably mounted arm operatively engaging said resistance element, said arm comprising a body portion of resilient material having an opening therethrough for the passage of a drive shaft, and rotatable cam means mounted on said arm for releasably securing said arm to said drive shaft, said rotatable cam means having an axis of rotation parallel to said drive shaft.

2. A potentiometer comprising a resistance element, a drive shaft, a resilient arm having an opening therein into which projects a resilient tongue and through which said drive shaft passes, and rotatable cam means disposed in said opening for releasably securing said arm to said shaft to be driven thereby, said rotatable means having an axis of rotation parallel to said drive shaft.

3. An arm for electrical appliances comprising a body portion having a generally V-shaped opening therein adapted to receive a drive at one extremity thereof, and means for releasably securing said arm to a shaft in said opening comprising rotatable cam means on said arm for causing the portion of said arm within said V-shaped opening to be displaced and thereby to secure said arm to a shaft or release said arm from a shaft.

4. The arm defined in claim 3 wherein said portion of said arm within said V-shaped opening comprises a resilient member.

5. The arm defined in claim 3 wherein said rotatable means comprises a cam member having a head portion adapted to receive an appropriate driving tool and a shank portion.

6. The arm defined in claim 4 wherein said portion of said arm within said V-shaped opening comprises a portion of the arm itself.

7. The arm defined in claim 5 wherein said shank portion is generally cylindrical in shape with a flattened portion.

8. An arm for electrical appliances, said arm comprising a body of elastic material, said body having a first opening therethrough adapted to receive a drive shaft, a drive shaft passing through said first opening being gripped by portions of said elastic body, and a rotatable cam means adapted to pass through another opening in said body adjacent said first opening and when rotated to force apart the portion of said body gripping a shaft in said first opening.

9. A potentiometer arm comprising a body formed of resilient material, said body having a first opening adapted to receive a drive shaft, a resilient arm forming at least a portion of the circumference of said first opening, said arm being formed by grooves penetrating said body, and rotary cam means adapted to fit in a second opening in said arm to force said arm tightly about a shaft.

10. The arm defined in claim 9 wherein said body further includes a rectilinear notch at one side thereof, and further including a block of insulating material fashioned to fit within said notch for supporting contact means.

11. An arm for electrical appliances comprises a body portion having an opening therein adapted to receive a drive shaft, releasable means for releasably securing said arm to a shaft in said opening, said releasable means comprising a resilient tongue member projecting into said opening, and rotatable cam means on said arm for causing said releasable means and the periphery of said opening to grippingly secure said arm to a shaft or release said arm from a shaft.

12. An arm for electrical appliances comprising a body portion having an opening therein adapted to receive a drive shaft, releasable means for releasably securing said arm to a shaft in said opening, said releasable means comprising a resilient tongue member projecting into said opening, and rotatable cam means on said arm for causing said releasable means and the periphery of said opening to grippingly secure said arm to a shaft or release said arm from a shaft, said rotatable means having an axis of rotation aligned in a direction substantially parallel to that of said drive shaft.

References Cited in the file of this patent
UNITED STATES PATENTS

| | | |
|---|---|---|
| 2,543,228 | Burgess | Feb. 27, 1951 |
| 2,676,226 | Mucher | Apr. 20, 1954 |
| 2,811,620 | Mucher et al. | Oct. 29, 1957 |
| 2,859,319 | Karg | Nov. 4, 1958 |
| 2,883,500 | Budd et al. | Apr. 21, 1959 |